United States Patent
McHenry et al.

(10) Patent No.: US 9,488,081 B2
(45) Date of Patent: Nov. 8, 2016

(54) EXHAUST MANIFOLD ASSEMBLY AND SYSTEM

(71) Applicant: Caterpillar Inc., Peoria, IL (US)

(72) Inventors: Ryan McHenry, Crawfordsville, IN (US); Christopher Reed, Washington, IL (US); Ronald Maloney, Peoria, IL (US); Lee Kress, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 61 days.

(21) Appl. No.: 14/573,368

(22) Filed: Dec. 17, 2014

(65) Prior Publication Data

US 2016/0177795 A1 Jun. 23, 2016

(51) Int. Cl.
| | | |
|---|---|---|
| F01N 13/10 | (2010.01) |
| F01N 13/14 | (2010.01) |
| F01N 3/04 | (2006.01) |
| F02B 37/00 | (2006.01) |
| F02B 39/08 | (2006.01) |
| F01N 13/08 | (2010.01) |

(52) U.S. Cl.
CPC ............... *F01N 3/046* (2013.01); *F01N 13/08* (2013.01); *F01N 13/10* (2013.01); *F01N 13/102* (2013.01); *F01N 13/14* (2013.01); *F02B 37/00* (2013.01); *F02B 39/08* (2013.01)

(58) Field of Classification Search
CPC ....... F01N 3/046; F01N 13/10; F01N 13/102
See application file for complete search history.

(56) References Cited

U.S. PATENT DOCUMENTS

| | | | | |
|---|---|---|---|---|
| 2,125,703 | A | * | 8/1938 | Williams ............. F01N 13/102 165/154 |
| 4,168,610 | A | | 9/1979 | Engquist |
| 4,179,884 | A | * | 12/1979 | Koeslin .................. F01N 3/046 29/455.1 |
| 4,182,122 | A | | 1/1980 | Stratton et al. |
| 5,305,603 | A | * | 4/1994 | Baumann ................ F01N 3/043 60/321 |
| 8,413,435 | B2 | | 4/2013 | Sloss et al. |
| 2009/0064670 | A1 | | 3/2009 | Kimura et al. |
| 2009/0156070 | A1 | | 6/2009 | Will |
| 2011/0252775 | A1 | * | 10/2011 | Joergl .................. F01D 25/145 60/321 |
| 2011/0271662 | A1 | | 11/2011 | Winsor |
| 2012/0096842 | A1 | | 4/2012 | Kroll et al. |

FOREIGN PATENT DOCUMENTS

| | | |
|---|---|---|
| GB | 1432293 A | 4/1976 |
| KR | 10-0794018 B1 | 1/2008 |

* cited by examiner

*Primary Examiner* — Audrey K Bradley
(74) *Attorney, Agent, or Firm* — Baker & Hostetler LLP

(57) ABSTRACT

An exhaust runner includes an exhaust runner inlet, an exhaust nozzle outlet aperture, and an impingement insulator. The exhaust runner inlet is configured to receive a first flow of an exhaust gas from an internal combustion engine. The exhaust nozzle outlet aperture is defined by an intersection of a tip flow passage and an internal surface of the exhaust runner. The exhaust nozzle outlet aperture is configured to introduce a second flow of the exhaust gas into the first flow of the exhaust gas. An impingement zone is defined by a projection of the outlet aperture onto the internal surface of the runner in a direction of the second flow of the exhaust gas. The impingement insulator is collocated with the impingement zone.

20 Claims, 3 Drawing Sheets

EXHAUST MANIFOLD ASSEMBLY AND SYSTEM

TECHNICAL FIELD

This patent disclosure relates generally to an exhaust system and, more particularly, to an exhaust manifold in an engine exhaust system.

BACKGROUND

In modern engine technology, turbochargers are powered by the hot exhaust gas from the engine. In general, the higher the exhaust velocity, the greater the amount of power in the exhaust that is available to power the turbochargers. It is desirable to convey the hot exhaust gas from the engine to the turbocharger in as high a temperature state as is possible to maintain the exhaust gas volume and, therefore, velocity in the exhaust system. However, it is also desirable to reduce the temperature of components within the engine compartment. Prior techniques provide water jackets disposed about exhaust manifolds to reduce the temperature of the manifold. Unfortunately, the use of water jackets reduces the temperature of the exhaust gas, thereby reducing the energy supplied to the turbocharger and also the temperature of recoverable heat energy.

Some attempts have been made to produce a manifold with temperatures within allowable limits and, at the same time, to maintain the temperature of the exhaust gas as high as possible. One such system described in U.S. Pat. No. 5,463,867 ("the '867 patent") provides a sleeve inside the manifold which is surrounded by an air space. The air space provides insulation for maintaining the exhaust gas temperature as high as possible and, at the same time, to reduce the amount of heat transferred to the water of the water jacket. However, the flow of the exhaust gasses within this system is restricted by the geometry of the connection pipes between the cylinder outlets and the exhaust pipe. As such, in the '867 patent and other systems, exhaust gas velocity is reduced.

Some other, non-water jacketed, exhaust systems such as U.S. Pat. No. 6,745,561 attempt to retain exhaust gas velocity by converging a set of runners in a manifold. However, turbulent exhaust flow is still present at the convergence of the runners and the overall shape of the resulting manifold is not conducive to jacketing.

Accordingly, there is a need for an improved exhaust system to address the problems described above and/or problems posed by other conventional approaches.

SUMMARY

The foregoing needs are met, to a great extent, by the present disclosure, wherein aspects of an improved exhaust system are provided.

In one aspect, the disclosure describes an exhaust runner. The exhaust runner includes an exhaust runner inlet, an exhaust nozzle outlet aperture, and an impingement insulator. The exhaust runner inlet is configured to receive a first flow of an exhaust gas from an internal combustion engine. The exhaust nozzle outlet aperture is defined by an intersection of a tip flow passage and an internal surface of the exhaust runner. The exhaust nozzle outlet aperture is configured to introduce a second flow of the exhaust gas into the first flow of the exhaust gas. An impingement zone is defined by a projection of the outlet aperture onto the internal surface of the runner in a direction of the second flow of the exhaust gas. The impingement insulator is collocated with the impingement zone.

In another aspect, the disclosure describes an exhaust assembly for an internal combustion engine. The exhaust assembly includes a turbocharger and an exhaust runner. The exhaust runner includes an exhaust runner inlet, an exhaust runner outlet, an exhaust nozzle outlet aperture, and an impingement insulator. The exhaust runner inlet is configured to receive a first flow of an exhaust gas from an internal combustion engine. The exhaust runner outlet is configured to deliver the first flow of the exhaust gas to the turbocharger. The exhaust nozzle outlet aperture is defined by an intersection of a tip flow passage and an internal surface of the exhaust runner. The exhaust nozzle outlet aperture is configured to introduce a second flow of the exhaust gas into the first flow of the exhaust gas. An impingement zone is defined by a projection of the outlet aperture onto the internal surface of the runner in a direction of the second flow of the exhaust gas. The impingement insulator is collocated with the impingement zone.

In yet another aspect, the disclosure describes a power supply. The power supply includes an internal combustion engine, an air system, and an exhaust assembly for the internal combustion engine. The air system is to deliver air to the internal combustion engine. The exhaust assembly includes a turbocharger and an exhaust runner. The turbocharger is configured to provide compressed air to the air system in response to an exhaust gas of the internal combustion engine. The exhaust runner includes an exhaust runner inlet, an exhaust runner outlet, an exhaust nozzle outlet aperture, and an impingement insulator. The exhaust runner inlet is configured to receive a first flow of an exhaust gas from an internal combustion engine. The exhaust runner outlet is configured to deliver the first flow of the exhaust gas to the turbocharger. The exhaust nozzle outlet aperture is defined by an intersection of a tip flow passage and an internal surface of the exhaust runner. The exhaust nozzle outlet aperture is configured to introduce a second flow of the exhaust gas into the first flow of the exhaust gas. An impingement zone is defined by a projection of the outlet aperture onto the internal surface of the runner in a direction of the second flow of the exhaust gas. The impingement insulator is collocated with the impingement zone.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the

DETAILED DESCRIPTION

Figure 1:
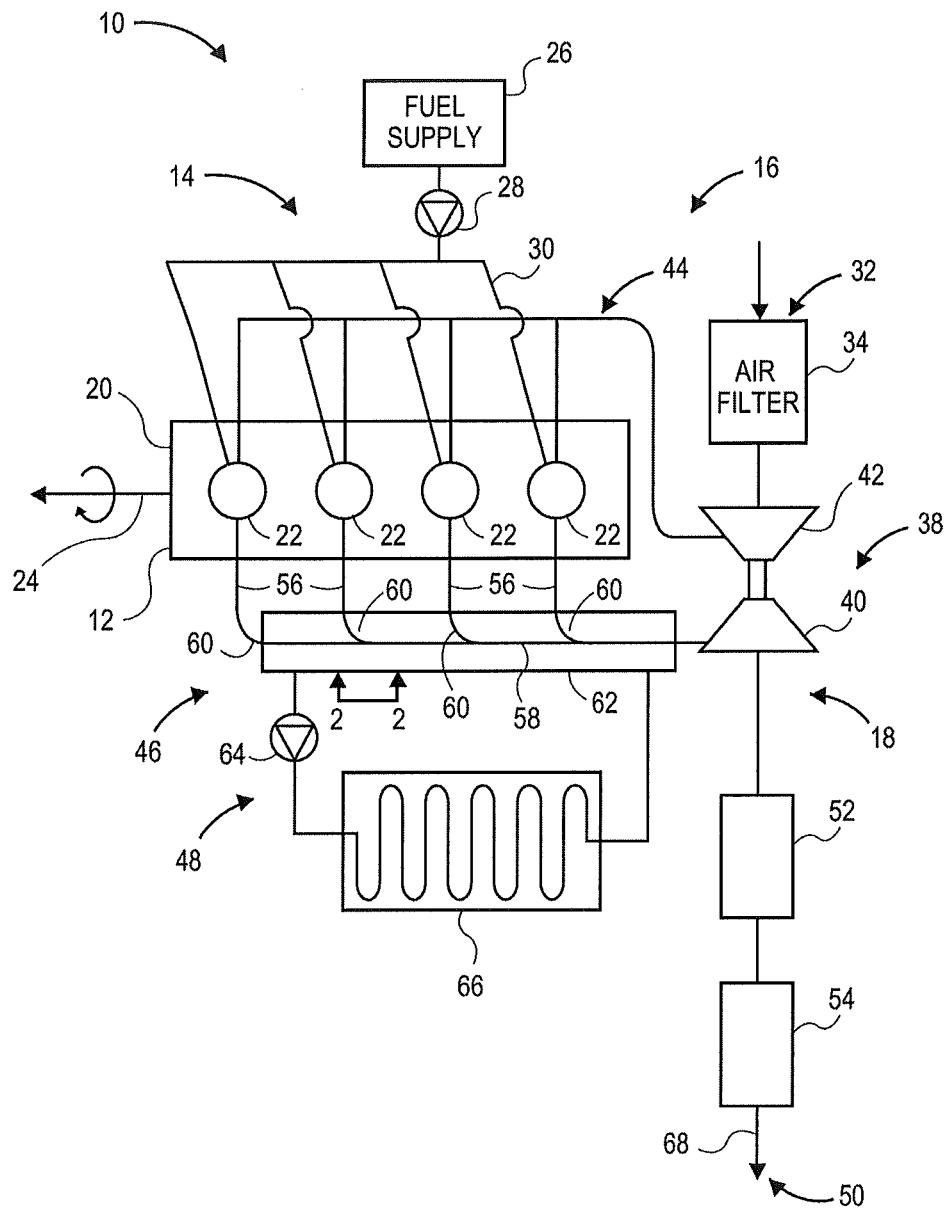
FIG. 1 is a diagrammatic schematic of an exemplary power source, according to an aspect of the disclosure.

Referring to FIG. 1, a power source 10 is shown. The power source 10 includes an internal combustion engine 12, a fuel system 14, an air system 16, and an exhaust system 18. The internal combustion engine 12 includes a block 20, a plurality of cylinders 22, and a drive shaft 24. The fuel system 14 includes a fuel supply 26, a fuel pump 28, and fuel lines 30. The internal combustion engine 12 may be a compression ignition engine, such as a diesel engine or a homogeneous charge compression ignition (HCCI) engine, for example, or a spark ignition engine. Although not shown, the fuel system 14 may also include other conventional components such as fuel filters, fuel injectors, and the like. In addition, other conventional components such as various filters, spark plugs or glow plugs, valves, controllers, and the like are suitable for use with various aspects of the power source 10.

The air system 16 includes an air inlet 32, an air filter 34, a turbocharger 38 having a turbine 40 and a compressor 42, and an intake manifold 44. The exhaust system 18 includes an exhaust manifold assembly 46, a water jacket assembly 48, the turbine 40, and a tail pipe 50. Optionally, the exhaust system 18 may include an emissions control device 52, such as a particulate filter, an oxidation catalyst, a selective reduction catalyst, or a three-way catalyst, for example; an acoustic muffler 54; or combinations thereof. The exhaust manifold assembly 46 includes an exhaust header or a plurality of exhaust pipes 56, an exhaust runner 58, and a plurality of exhaust nozzle tips 60 to fluidly connect the exhaust pipes 56 to the exhaust runner 58. The water jacket assembly 48 includes a water jacket 62, a water pump 64, and a heat exchanger 66.

As is generally understood, fuel and air are combined and ignited in combustion chambers defined at least partly by the cylinders 22 and the block 20 to drive the engine 12 and generate power that is output from the drive shaft 24. The combustion byproducts, i.e. an exhaust gas 68, then flow through the exhaust system 18. As the exhaust gas 68 flows through the turbine 40, the exhaust gas 68 urges the turbine 40 to rotate which, in turn, rotates the compressor 42 for compressing fresh air. The compressed fresh air then flows to an intake manifold 44 of the engine 12. Various well-understood controls may be utilized to regulate the temperature, power output, and the like of the power source 10.

The power source 10 is suitable for use with a fixed or mobile machine that performs some type of operation associated with an industry such as mining, construction, farming, transportation, power generation, or another industry known in the art. For example, the power source 10 may power an earth moving machine such as an excavator, a dozer, a loader, a backhoe, a motor grader, a dump truck, or another earth moving machine. In a particular example, the power source 10 includes an engine 12 configured to burn a fuel such as natural gas, gasoline, diesel, or any other combustible fuel known in the art.

As described herein, the exhaust manifold assembly 46 is configured to improve heat retention in the flow of the exhaust gas 68 therethrough by increasing the amount of insulation at specific locations. While the exhaust runner 58 is insulated from the water jacket 62 to a certain extent, thermal analysis of the exhaust runner 58 has been used to identify particularly hot locations. By increasing the insulation at these 'hot spots', the temperature of the exhaust gas 68 is maintained as it flows through the exhaust runner 58. Due to the well understood correlation between temperature and volume, this retention of thermal energy in the exhaust gas 68 promotes high velocity of the exhaust gas 68. Aspects of the disclosure may advantageously preserve kinetic energy, thermal energy, static pressure, or both, of the exhaust gas 68 through the exhaust manifold assembly 46 and thereby increase fluid power available to drive the turbocharger 38. This increased power driving the turbocharger 38 promotes higher compression of fresh air delivered to the engine 12 which, in turn, facilitates greater power output at the drive shaft 24. In addition to these direct improvements in the power production of the power source 10, aspects of the disclosure may enable a reduction in the physical size of the power source 10 while maintaining power output comparable to physically larger conventional power sources. By reducing the size, and therefore weight, of the power source 10, a lighter suspension, frame, and various other components may be utilized by a machine using the power source 10. As such, aspects described herein may greatly facilitate improvements in performance, improved fuel efficiencies, reduced material costs, and the like.

Figure 2:
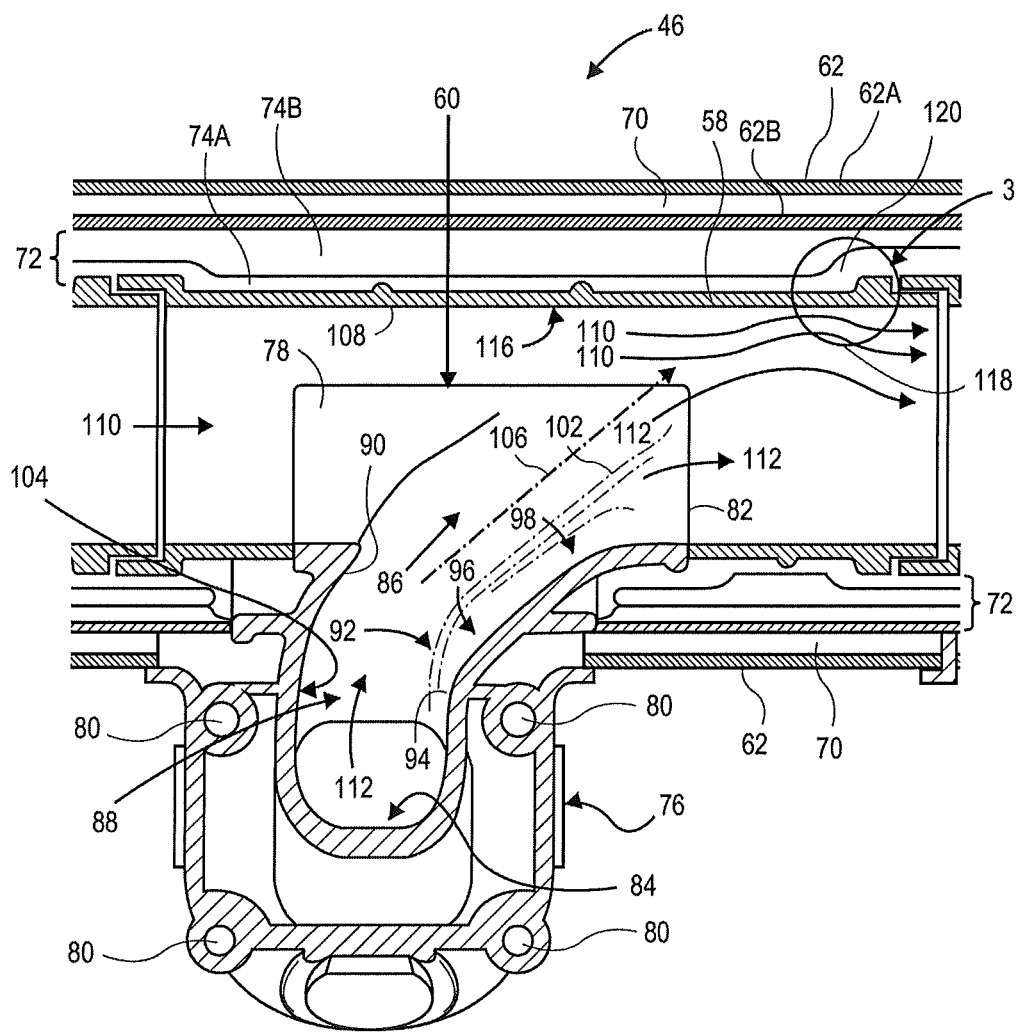
FIG. 2 is a cross sectional view 2-2 of a portion of an exhaust manifold, according to an aspect of the disclosure.

FIG. 2 is a cross sectional view 2-2 of a portion of the exhaust manifold assembly 46 according to an aspect of the disclosure. As shown in FIG. 2, the exhaust manifold assembly 46 includes the exhaust runner 58 and the exhaust nozzle tip 60. The exhaust runner 58 is configured to convey a first flow 110 of the exhaust gas 68 to the turbocharger 38 shown in FIG. 1. The water jacket 62 is disposed about the exhaust runner 58 and includes an outside jacket wall 62A and an inside jacket wall 62B. The outside jacket wall 62A and the inside jacket wall 62B are configured to receive a flow of water 70 therebetween.

An insulating layer 72 disposed between the exhaust runner 58 and the water jacket 62 to reduce a heat transfer of heat from the exhaust runner 58 to the flow of water 70 in the water jacket 62. The insulating layer 72 may include any suitable insulating gas and/or material. Examples of suitable gasses and materials include air, glass and ceramic fibers, and the like. In some examples, the insulating layer 72 includes one or both of an air gap 74A and insulation material 74B. The air gap 74A is defined by the exterior of the exhaust runner 58 and the insulation material 74B, if present. If the insulation material 74B is not present, the air gap 74A is defined by the exterior of the exhaust runner 58 and the interior of the inside jacket wall 62B. Of note, while referred to as the 'air' gap 74A, the passage defined as the air gap 74A is suitable for retaining or conveying any suitable gas such as air, exhaust, nitrogen, carbon dioxide, etc.

The exhaust nozzle tip 60 is configured to fluidly connect the internal combustion engine 12 to the exhaust runner 58.

In this regard, the exhaust nozzle tip 60 includes an engine flange 76 and a runner flange 78. In a particular example, the engine flange 76 has a plurality of bores 80 for the passage of a respective plurality of bolts (not shown) for securing the exhaust nozzle tip 60 to the internal combustion engine 12. In other examples, various other fasteners may be utilized to fasten the exhaust nozzle tip 60 to the internal combustion engine 12.

The runner flange 78 is configured to mate with a runner cutout 82 of the exhaust runner 58. In a particular example, the runner flange 78 is welded into the runner cutout 82. In other examples, various other fasteners may be utilized to fasten the runner flange 78 to the exhaust runner 58. The exhaust nozzle tip 60 includes an exhaust nozzle inlet 84, an outlet aperture 86, and a tip flow passage 88. The exhaust nozzle inlet 84 is configured to receive a second flow 112 of the exhaust gas 68 from a cylinder 22 of the internal combustion engine 12 (shown in FIG. 1). The outlet aperture 86 is configured to introduce the second flow 112 of the exhaust gas 68 into the first flow 110 of the exhaust gas 68 in the exhaust runner 58.

While the geometry of exhaust nozzle tip 60 facilitates an introduction of the second flow 112 of the exhaust gas 68 into the first flow 110 of the exhaust gas 68 in the exhaust runner 58 with reduced turbulence, the second flow 112 of the exhaust gas 68 may result an impingement of the exhaust gas 68 against an inner wall of the exhaust runner 58 at an area in line with and/or slightly downstream of the outlet aperture 86. For the purposes of this disclosure, the term, 'impingement' is defined as an impact or collision of the exhaust gas 68 against the inner wall of the exhaust runner 58.

In general, in a pipe with a fluid flowing smoothly therethrough, a boundary layer of fluid is generated very near the inner surface of the pipe. This boundary layer of fluid reduces heat transfer between the pipe surface and the rest of the flow of fluid. In the same way, the first flow 110 of the exhaust gas 68 in the exhaust runner 58 generates a boundary layer 116 that reduces heat transfer between the exhaust runner 58 and the first flow 110 of the exhaust gas 68. In response to the second flow 112 of the exhaust gas 68 entering the exhaust runner 58, the boundary layer 116 may be disturbed at an impingement zone 118. In order to reduce or prevent heat from being lost at the impingement zone 118, an impingement insulator 120 is provided that corresponds to or is collocated with the impingement zone 118. In various aspects, the impingement insulator 120 may include a relatively larger air gap than is provided in the rest of the insulating layer 72 and/or a patch of insulation 122 (shown in FIG. 3B) that provides added insulation over and above that of the insulating layer 72. The impingement insulator 120 offers improvements increasing the insulation covering the entire exhaust manifold assembly 46 in that the exhaust manifold assembly 46 may be made smaller without sacrificing performance. That is, by improving insulation at the impingement insulator 120, the overall performance of the exhaust manifold assembly 46 may be improved.

An internal surface 104 of the exhaust nozzle tip 60 defines the tip flow passage 88 therethrough, and the tip flow passage 88 defines a tip flow axis 106 therein. According to an aspect of the disclosure, the tip flow axis 106 is substantially collocated with a locus of cross sectional area centroids of the tip flow passage 88. According to another aspect of the disclosure, the tip flow axis 106 is substantially parallel to the tip flow passage 88 along a flow direction through the tip flow passage 88. According to another aspect of the disclosure, a bulk flow direction through the tip flow passage 88 is substantially tangent to the tip flow axis 106 at each point of the tip flow axis 106.

An intersection of the tip flow passage 88 and an internal surface 108 of the exhaust runner 58 defines the outlet aperture 86 of the tip flow passage 88. An intersection of the tip flow axis 106 and the outlet aperture 86 of the tip flow passage 88 defines the direction of the second flow 112 from the tip flow passage 88. According to an aspect of the disclosure, a projection of the outlet aperture 86 of the tip flow passage 88 onto the internal surface 108 of the exhaust runner 58 along the second flow 112 at least partly defines the impingement zone 118. It will be appreciated that the impingement zone 118 may extend downstream beyond the projection of the outlet aperture 86 of the tip flow passage 88 onto the internal surface 108 of the exhaust runner 58 along a direction of the first flow 110 because of momentum imparted to the second flow 112 by the first flow 110.

The tip flow passage 88 is configured to convey the second flow 112 of the exhaust gas 68 from the exhaust nozzle inlet 84 to the outlet aperture 86. The tip flow passage 88 is defined by an upstream curved surface 90 and a downstream surface 92. The upstream curved surface 90 may be a continuous curve that directs the second flow 112 of the exhaust gas 68 up into the first flow 110 of the exhaust gas 68 in the exhaust runner 58. According to an aspect of the disclosure, the upstream curved surface 90 begins along a line that is perpendicular to the first flow 110 and is a continuous arc that ends within the exhaust runner 58 at an angle between 60 degrees relative to the first flow 110 and 15 degrees relative to the first flow 110 of the exhaust gas 68. In this manner, the second flow 112 of the exhaust gas 68 is accelerated in the direction of the first flow 110 of the exhaust gas 68 along the arc of the upstream curved surface 90 and enters the first flow 110 of the exhaust gas 68 with approximately the same velocity in the direction of the first flow 110 of the exhaust gas 68. By approximately matching the velocities of the two flows, turbulence can be reduced or minimized.

The downstream surface 92 has a first downstream curve 94, a straight portion 96, and a second downstream curve 98. The first downstream curve 94 curves relatively more sharply than the upstream curved surface 90 to generate a diverging zone 100. In a particular example, the first downstream curve 94 transitions from perpendicular to the first flow 110 to between 60 degrees relative to the first flow 110 and 15 degrees relative to the first flow 110. This diverging zone 100 increases a cross sectional area of the tip flow passage 88. In this manner, a density of the second flow 112 of the exhaust gas 68 can be reduced just prior to being introduced into the first flow 110 of the exhaust gas 68. As these two flows merge, the diverging zone 100 provides a volume for the second flow 112 of the exhaust gas 68 to be compressed into by the first flow 110 of the exhaust gas 68. In this manner, turbulence is reduced during the merger of the two flows.

The straight portion 96 extends outward from the first downstream curve 94 to further generate the volume for the second flow 112 of the exhaust gas 68 to be compressed into by the first flow 110 of the exhaust gas 68. The second downstream curve 98 transitions from the straight portion 96 to a downstream portion of the exhaust runner 58. The second downstream curve 98 has a side portion 102 that continues along a line defined by the straight portion 96. The first flow 110 of the exhaust gas 68 is introduced into a first flow 110 of the exhaust gas 68 while maintaining a velocity of the first flow 110 of the exhaust gas 68.

Figure 3A:
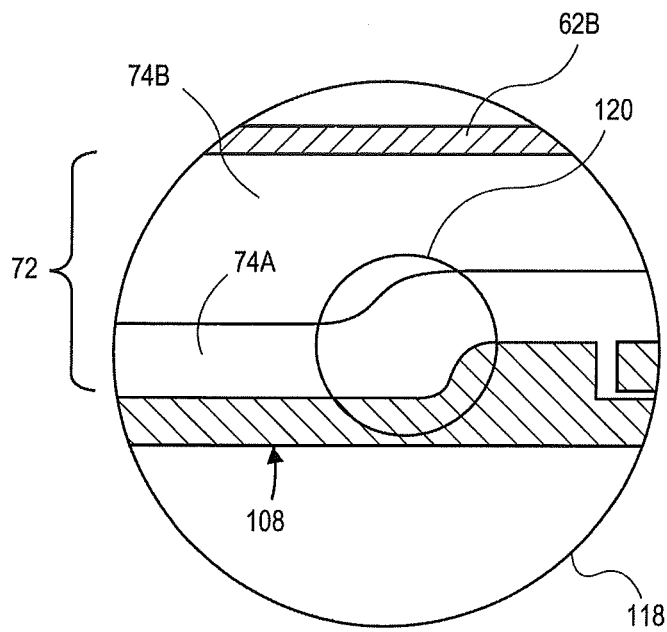
FIG. 3A is a detail of the cross sectional view 2-2 of a portion of an exhaust manifold, according to an aspect of the disclosure.

FIG. 3A is a detail 3 of the cross sectional view 2-2 of a portion of the exhaust manifold assembly 46, according to an aspect of the disclosure. As shown in FIG. 3A, the impingement insulator 120 is proximal to or collocated with the impingement zone 118. In the particular example shown in FIG. 3A, the impingement insulator 120 includes a chamber suitable for containing a gas and this chamber is relatively enlarged in comparison to the air gap 74A. That is, the air gap 74A is relatively enlarged at the impingement insulator 120. Because air and other suitable gasses are insulators and an insulation value of an insulator directly corresponds to the thickness of the insulator, enlarging the air gap 74A increases the insulation value over the impingement zone 118.

Figure 3B:
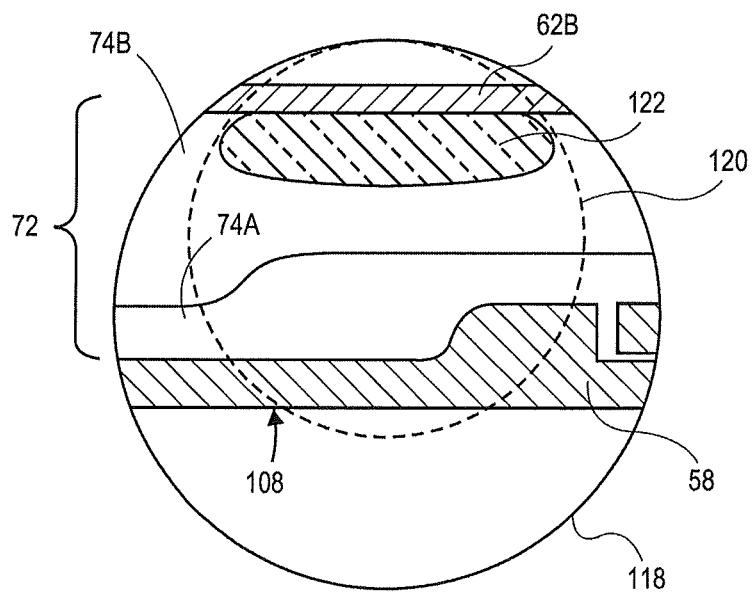
FIG. 3B is a detail of the cross sectional view 2-2 of a portion of an exhaust manifold, according to another aspect of the disclosure.

FIG. 3B is a detail 3 of the cross sectional view 2-2 of a portion of the exhaust manifold assembly 46, according to another aspect of the disclosure. As shown in FIG. 3B, the impingement insulator 120 may include the patch of insulation 122 that provides added insulation over and above that of the insulating layer 72. The patch of insulation 122 is proximal to or collocated with the impingement zone 118 and may include any suitable insulating material. Examples of suitable materials include fiber glass or other spun fibers, ceramics, and the like. The patch of insulation 122 may be held in place or otherwise affixed proximal to the impingement zone 118 and/or between the impingement zone 118 and the inside jacket wall 62B in any suitable manner such as, for example: adhesives; fasteners such as clips and wrappings; friction such as packing the area with the patch of insulation; and the like.

Also shown in FIG. 3B, the optional insulation material 74B is shown disposed between the inside jacket wall 62B and the exhaust runner 58. If included, the insulation material 74B may be relatively thicker proximal to the impingement zone 118 and/or the patch of insulation 122 may have a relatively higher insulation value in order to provide an overall higher insulation value proximal to the impingement zone 118. Of note, the patch of insulation 122 may be utilized alone or in conjunction with the air gap 74A that is relatively enlarged proximal to the impingement zone 118 in comparison to the air gap 74A that is not proximal to the impingement zone 118.

In various examples shown in FIGS. 3A and 3B, the degree to which the impingement insulator 120 is enlarged and/or the insulation value is increased in comparison to the insulating layer 72 may include from between about 20% to about 10 times the size. In some particular examples, the impingement insulator 120 is enlarged in comparison to the insulating layer 72 by 20%, 50%, 2×, 3×, 4×, 5×, and the like. In a specific example, the impingement insulator 120 is enlarged to 25.5 mm in comparison to the insulating layer 72 having a thickness of 19 mm.

INDUSTRIAL APPLICABILITY

The present disclosure may be applicable to any power supply for generating power. Aspects of the disclosed exhaust system 18 may promote greater power output from the power supply, greater fuel efficiency, operational flexibility, reduced packaging size, performance improvements, or combinations thereof, for power supplies in general and power supplies for use in mobile machines in particular.

Applicants discovered that heat loss at the impingement zone 118 disproportionately affected the temperature, and therefore the velocity, of the exhaust gas 68 being delivered to the turbocharger 38. Applicants further discovered that by increasing the insulation at the impingement zone 118, the overall performance of the exhaust system 18 could be improved and this lead to an improved performance of the turbocharger 38 and, therefore, the ability of the turbocharger 38 to compress and deliver fresh air to the engine 12. As described herein, aspects of the disclosure may advantageously preserve kinetic energy, static pressure, or both, of the exhaust gas 68 through the exhaust manifold assembly 46 and thereby increase fluid power available to drive the turbocharger 38. This increased power driving the turbocharger 38 promotes higher compression of fresh air delivered to the engine 12 which, in turn, facilitates greater power output at the drive shaft 24. In addition to these direct improvements in the power production of the power source 10, aspects of the disclosure may enable a reduction in the physical size of the power source 10 while maintaining power output comparable to physically larger conventional power sources. By reducing the size, and therefore weight, of the power source 10, a lighter suspension, frame, and various other components may be utilized by a machine using the power source 10. As such, aspects described herein may greatly facilitate improvements in performance, improved fuel efficiencies, reduced material costs, and the like.

According to an aspect of the disclosure shown in FIG. 1, in operation, the exhaust manifold assembly 46 is fastened to the engine 12 using fasteners. Proper sealing between the exhaust manifold assembly 46 and the engine 12 is generally achieved using gaskets. The exhaust manifold assembly 46 is aligned with the exhaust ports for communication of the exhaust gas 68 from the engine 12 through the exhaust runner 58 to the turbine 40 of the turbocharger 38. The exhaust gas 68 drives the turbine 40 of the turbocharger 38 which is operatively connected to the compressor 42 of the turbocharger 38. The compressor 42 compresses the fresh air and routes the compressed air to the intake manifold 44 of the engine 12.

According to an aspect of the disclosure shown in FIG. 2, the boundary layer 116 is disturbed at the impingement zone 118 as a result of the second flow 112 of the exhaust gas 68 entering the exhaust runner 58. The impingement insulator 120 is provided that corresponds to the impingement zone 118 in order to reduce or prevent heat from being lost at the impingement zone 118. In this manner, the temperature, and therefore the velocity, of the exhaust gas 68 delivered to the turbocharger 38 are relatively higher than in conventional exhaust systems. This higher velocity exhaust gas 68 shown herein provides greater power for the turbocharger 38 and, ultimately, for the power source 10.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified. The many features and advantages of the various aspects are apparent from the detailed specification, and thus, it is intended by the appended claims to cover all such features and advantages that fall within the true spirit and scope of the aspects. Further, since numerous modifications and variations will readily occur to those skilled in the art, it is not desired to limit the aspects to the exact construction and operation illustrated and described, and accordingly, all suitable modifications and equivalents may be resorted to, falling within the scope of the various aspects.

We claim:

1. An exhaust manifold assembly comprising:
    an exhaust runner having an inlet configured to receive a first flow of an exhaust gas from an internal combustion engine, a flow direction of the first flow of the exhaust gas defining an axial direction of the exhaust manifold assembly;
    an exhaust nozzle fluidly coupled to the exhaust runner, an outlet aperture of the exhaust nozzle being defined by an intersection of a tip flow passage and an internal surface of the exhaust runner, the outlet aperture of the exhaust nozzle being configured to introduce a second flow of the exhaust gas into the first flow of the exhaust gas;
    an impingement zone of the exhaust runner defined by a projection of the outlet aperture onto the internal surface of the exhaust runner in a direction of the second flow of the exhaust gas;
    a water jacket assembly disposed circumferentially about the exhaust runner;
    a solid insulation layer disposed between the exhaust runner and the water jacket assembly along a radial direction of the exhaust manifold assembly, the radial direction being perpendicular to the axial direction; and
    a gaseous insulation layer disposed between the exhaust runner and the water jacket assembly along the radial direction,
    the solid insulation layer having a first solid thickness along the radial direction at an axial location that is collocated with the impingement zone,
    the gaseous insulation layer having a first gaseous thickness along the radial direction at the axial location that is collocated with the impingement zone,
    the first gaseous thickness being greater than the first solid thickness.

2. The exhaust manifold assembly of claim 1, wherein a flow area of the tip flow passage increases along a flow direction from an inlet of the exhaust nozzle toward the outlet aperture of the exhaust nozzle.

3. The exhaust manifold assembly of claim 2, wherein an internal surface of the exhaust nozzle includes an upstream surface and a downstream surface, a concavity of the upstream surface facing the downstream surface, and
    wherein the exhaust nozzle is configured to accelerate the second flow of the exhaust gas along the axial direction.

4. The exhaust manifold assembly of claim 1, wherein the solid insulation layer includes an insulating material selected from the group consisting of glass fibers and ceramic fibers.

5. The exhaust manifold assembly of claim 4, wherein the gaseous insulation layer includes air.

6. The exhaust manifold assembly of claim 1, wherein the gaseous insulation layer has a second gaseous thickness along the radial direction at an axial location outside the impingement zone, and
    the first gaseous thickness is greater than the second gaseous thickness.

7. The exhaust manifold assembly of claim 6, wherein the solid insulation layer has a second solid thickness along the radial direction at the axial location outside the impingement zone, and
    the first solid thickness is less than the second solid thickness.

8. The exhaust manifold assembly of claim 6, wherein the gaseous insulation layer is disposed between the solid insulation layer and the exhaust runner along the radial direction.

9. An exhaust assembly for an internal combustion engine, the exhaust assembly comprising:
    a turbocharger; and
    an exhaust manifold including
        an exhaust runner having an inlet configured to receive a first flow of an exhaust gas from the internal combustion engine, and an outlet fluidly coupled to the turbocharger, a flow direction of the first flow of the exhaust gas defining an axial direction of the exhaust manifold;
        an exhaust nozzle fluidly coupled to the exhaust runner, an outlet aperture of the exhaust nozzle being defined by an intersection of a tip flow passage and an internal surface of the exhaust runner, the outlet aperture of the exhaust nozzle being configured to introduce a second flow of the exhaust gas into the first flow of the exhaust gas;
        an impingement zone of the exhaust runner defined by a projection of the outlet aperture onto the internal surface of the exhaust runner in a direction of the second flow of the exhaust gas;
        a water jacket assembly disposed circumferentially about the exhaust runner;
        a solid insulation layer disposed between the exhaust runner and the water jacket assembly along a radial direction of the exhaust manifold, the radial direction being perpendicular to the axial direction; and
        a gaseous insulation layer disposed between the exhaust runner and the water jacket assembly along the radial direction,
        the solid insulation layer having a first solid thickness along the radial direction at an axial location that is collocated with the impingement zone,
        the gaseous insulation layer having a first gaseous thickness along the radial direction at the axial location that is collocated with the impingement zone,
        the first gaseous thickness being greater than the first solid thickness.

10. The exhaust assembly according to claim 9, further comprising an exhaust nozzle tip having an exhaust nozzle inlet configured to receive the exhaust gas from a cylinder of the internal combustion engine and convey the exhaust gas to the outlet aperture of the exhaust nozzle.

11. The exhaust assembly of claim 9, wherein a flow area of the tip flow passage increases along a flow direction from an inlet of the exhaust nozzle toward the outlet aperture of the exhaust nozzle.

12. The exhaust assembly of claim 11, wherein an internal surface of the exhaust nozzle includes an upstream surface and a downstream surface, a concavity of the upstream surface facing the downstream surface, and wherein the exhaust nozzle is configured to accelerate the second flow of the exhaust gas along the axial direction.

13. The exhaust assembly of claim 9, wherein the gaseous insulation layer has a second gaseous thickness along the radial direction at an axial location outside the impingement zone, and
the first gaseous thickness is greater than the second gaseous thickness.

14. The exhaust assembly of claim 13, wherein the solid insulation layer has a second solid thickness along the radial direction at the axial location outside the impingement zone, and
the first solid thickness is less than the second solid thickness.

15. The exhaust assembly of claim 13, wherein the gaseous insulation layer is disposed between the solid insulation layer and the exhaust runner along the radial direction.

16. A power supply comprising:
an internal combustion engine;
an air system fluidly coupled to the internal combustion engine for delivering air to the internal combustion engine; and
an exhaust assembly fluidly coupled to the internal combustion engine, the exhaust assembly including a turbocharger and an exhaust manifold,
the turbocharger being configured to extract work from an exhaust gas of the internal combustion engine and compress the air in the air system,
the exhaust manifold including
an exhaust runner having an inlet configured to receive a first flow of the exhaust gas from the internal combustion engine, and an outlet fluidly coupled to the turbocharger, a flow direction of the first flow of the exhaust gas defining an axial direction of the exhaust manifold;
an exhaust nozzle fluidly coupled to the exhaust runner, an outlet aperture of the exhaust nozzle being defined by an intersection of a tip flow passage and an internal surface of the exhaust runner, the outlet aperture of the exhaust nozzle being configured to introduce a second flow of the exhaust gas into the first flow of the exhaust gas;
an impingement zone of the exhaust runner defined by a projection of the outlet aperture onto the internal surface of the exhaust runner in a direction of the second flow of the exhaust gas;
a water jacket assembly disposed circumferentially about the exhaust runner;
a solid insulation layer disposed between the exhaust runner and the water jacket assembly along a radial direction of the exhaust manifold, the radial direction being perpendicular to the axial direction; and
a gaseous insulation layer disposed between the exhaust runner and the water jacket assembly along the radial direction,
the solid insulation layer having a first solid thickness along the radial direction at an axial location that is collocated with the impingement zone,
the gaseous insulation layer having a first gaseous thickness along the radial direction at the axial location that is collocated with the impingement zone,
the first gaseous thickness being greater than the first solid thickness.

17. The power supply of claim 16, wherein a flow area of the tip flow passage increases along a flow direction from an inlet of the exhaust nozzle toward the outlet aperture of the exhaust nozzle.

18. The power supply of claim 16, wherein the gaseous insulation layer has a second gaseous thickness along the radial direction at an axial location outside the impingement zone, and
the first gaseous thickness is greater than the second gaseous thickness.

19. The power supply of claim 18, wherein the solid insulation layer has a second solid thickness along the radial direction at the axial location outside the impingement zone, and
the first solid thickness is less than the second solid thickness.

20. The power supply of claim 18, wherein the gaseous insulation layer is disposed between the solid insulation layer and the exhaust runner along the radial direction.

* * * * *

UNITED STATES PATENT AND TRADEMARK OFFICE
CERTIFICATE OF CORRECTION

| | | |
|---|---|---|
| PATENT NO. | : 9,488,081 B2 | Page 1 of 1 |
| APPLICATION NO. | : 14/573368 | |
| DATED | : November 8, 2016 | |
| INVENTOR(S) | : McHenry et al. | |

It is certified that error appears in the above-identified patent and that said Letters Patent is hereby corrected as shown below:

On the Title Page

Column 2, Item (74) (Attorney, Agent, or Firm), Line 1, delete "Baker & Hostetler LLP" and insert -- Baker & Hostetler LLP; Hibshman Claim Construction PLLC --.

Signed and Sealed this
Eleventh Day of April, 2017

Michelle K. Lee
*Director of the United States Patent and Trademark Office*